May 7, 1935.  R. O. FRIEND ET AL  2,000,696

ZEOLITE WATER SOFTENER

Filed June 9, 1932  2 Sheets-Sheet 2

Inventor
ROBERT O. FRIEND
JOHN A. MONTGOMERY
By
Attorney

Patented May 7, 1935

2,000,696

UNITED STATES PATENT OFFICE 2,000,696

ZEOLITE WATER SOFTENER

Robert O. Friend and John A. Montgomery, Chicago, Ill.

Application June 9, 1932, Serial No. 616,186

2 Claims. (Cl. 210—24)

This invention relates to water softening tanks of the type employing zeolites and similar base exchange materials and also to sand filters and similar water treating devices. At the present time, when it is desired to overhaul a softener or filter or renew the mineral or sand therein, it is necessary to shovel or lift the entire contents from the tank by hand which involves considerable time and labor.

The principal object of the present invention is to provide means whereby the zeolite, filtering material or other contents can be quickly and easily discharged from the tank by means of flowing water so as to eliminate the time and labor that is usually required for this purpose.

In the usual softening or filtering tank there is a bed of gravel or coarse material supported in the bottom of the tank upon a porous plate or pipe grid. This bed supports the relatively fine zeolite or filtering material. The present invention contemplates forming a relatively large, valve-controlled, discharge in the wall of the tank a desirable distance above the gravel bed so that when the valve is opened, water can flow from the inside of the tank through the discharge to carry the zeolite or filtering material with it.

In using the ordinary base exchange, water softening tank, raw water flows upward in the tank through a bed of zeolite or similar material. The material removes the hardening elements and the soft water is drawn off the top of the tank. To regenerate the zeolite, a salt solution is passed downward through the zeolite and discharged at the bottom of the tank. When the regeneration has been completed, raw water is passed into the top of the tank so as to pass downwardly to flush the salt solution from the zeolite. When the flushing operation is completed the tank above the zeolite is filled with hard or untreated water. It is the usual custom to eliminate this water by passing water upward through the zeolite and allowing it to discharge to waste from the top of the tank until all the hard water has been replaced by soft or treated water. This latter method results in considerable waste of treated or soft water.

Another object of this invention is to provide a siphon by means of which the layer of hard water above the zeolite can be siphoned off without waste of soft water.

If an operator should inadvertently fail to close off the siphon pipe before admitting water and placing his machine in operation, the soft water would flow through the siphon to the waste. Such a condition might continue for considerable time before it was noticed so as to cause considerable waste of the soft or treated water, and also in considerable waste of the zeolite which is lifted and carried through the siphon pipe.

A further object of this invention is to so construct and arrange the valves of the system that it would be impossible for an operator to turn the main supply into the bottom of the tank without his becoming aware of the siphon pipe being open, so as to prevent unnecessary wastage of the treated water and zeolite.

Other objects and advantages reside in the detail construction of the invention, which is designed for simplicity, economy, and efficiency. These will become more apparent from the following description.

In the following detailed description of the invention reference is had to the accompanying drawings which form a part thereof. Like numerals refer to like parts in the drawings and throughout the description.

The invention will be described as applied to a water softening tank of the zeolite type. It is to be understood, however, that the invention is not limited to this use but will be found valuable for use in water filtering tanks and other installations wherein sand or similar granular or comminuted materials are employed.

Figure 1:
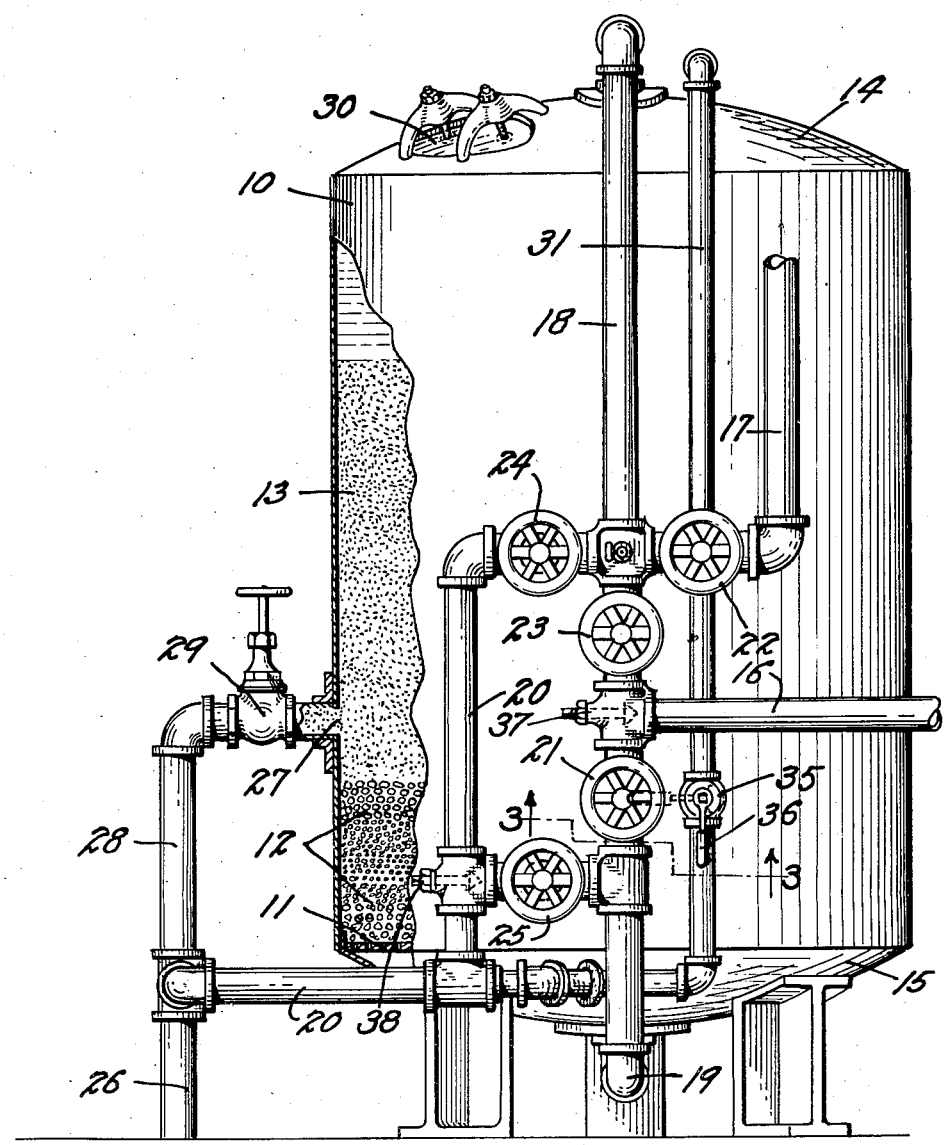
Fig. 1 illustrates a side elevation of a typical softening tank with the construction of this invention embodied. The tank is partially broken away to show the contents.
Figure 2:
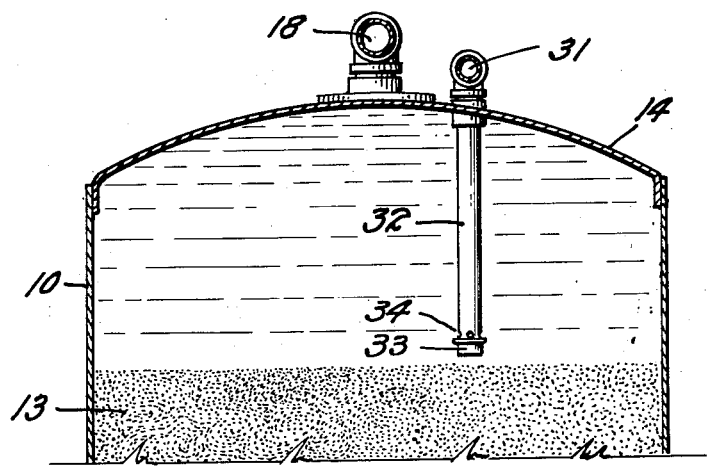
Fig. 2 is a cross-section through the upper portion of the tank of Fig. 1.

In the drawings, a softening tank is indicated at 10, provided with the usual porous, false bottom 11 for supporting a gravel bed 12. The zeolite or softening mineral is indicated on the drawings at 13, supported by the gravel bed 12. The tank 10 is closed at its top by means of a head plate 14, and at its bottom by means of a bottom plate 15.

The water to be treated or raw water is received through a main supply pipe 16 and the treated or soft water is delivered through a soft water pipe 17. A top pipe 18 communicates through the top of the tank 10 and a bottom pipe 19 communicates through the bottom thereof. A waste pipe 20 is arranged to discharge to a suitable sewer connection 26.

A main supply valve 21 controls the supply of raw water the bottom pipe 19 and soft water valve 22 controls the soft water delivered by the machine. A secondary supply valve 23 allows raw water to flow into the top of the tank for flushing purposes. An upper waste valve 24 and a lower waste valve 25 allow water to be discharged to the waste pipe 26, from either top or bottom of the tank, respectively.

As thus far described, the drawings illustrate a typical water softening installation. The present invention contemplates forming a relatively large discharge opening 27 in the wall of the tank 10 a short distance above the gravel bed 12. The discharge opening 27 communicates with a discharge pipe 28 controlled by means of a suitable gate valve 29.

The usual tank of this type is provided with a man hole 30 in its top, through which, the material 13 must be shoveled or lifted when it is desired to remove it. With the present invention, however, this labor is entirely eliminated. When it is desired to remove the material, the valves 22, 23, 24 and 25 are closed and the main supply valve 21 is opened to project an upward flow of water into the tank with sufficient velocity to loosen and bring all of the material 13 into suspension. The valve 29 is then opened to provide an outlet for the water and suspended material, causing it to rush through the discharge opening 27. The material can be allowed to run to the sewer through the connection 26 or can be recovered by means of a screen or settling basin, as desired.

The outlet 27 is preferably positioned just a sufficient distance above the gravel bed 12 to prevent any of the latter from being discharged. It can however, be placed in any desired position for with sufficient velocity on the rising current of water the material will be carried to the discharge opening regardless of its position.

The saving of time, labor and expense can be readily appreciated. The former methods of removing the active materials from the tanks required hours whereas, with the use of this invention, better results are accomplished almost instantly.

After a regeneration operation, raw water is passed through the top of the tank 10 through the valve 23 to flush the remaining salt solution from the zeolite through the waste valve 25. At the conclusion of the flushing operation the top of the tank is filled with raw or untreated water. To remove this water, a siphon pipe 31 is employed which terminates at the top in a downwardly turned extremity 32 within the tank. The extremity 32 is perforated as shown at 34 and terminates in a cap 33. The lower extremity of the siphon pipe may communicate with any desired receiver or with the waste pipe 26 as illustrated.

The siphon pipe 31 is controlled by means of a quick acting plug valve 35 provided with a handle 36 which, when in the vertical position, closes the valve 35 and, when in the horizontal position, opens the valve.

Figure 3:
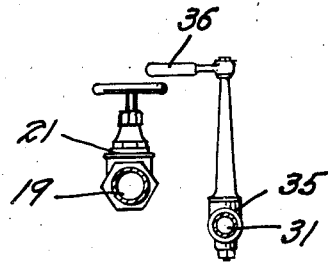
Fig. 3 is a detail horizontal section, looking upward, taken on the line 3—3, Fig. 1.

It is desired to call particular attention to the fact that the main supply valve 21 and the siphon valve 35 are arranged so that the handle 36, when in the open position will lie partly over the hand wheel of the supply valve 21 as shown in Fig. 3. This makes it impossible for the operator to open the valve 21 without noticing whether the siphon valve is closed. This prevents waste of the zeolite through the siphon pipe.

When it is desired to remove the raw water from the top of the tank 10, after the flushing operation, it is only necessary to open the siphon valve 35 and allow this water to siphon from the tank through the siphon pipe 31.

The rate of flow through a softening tank of a given size must not exceed a certain maximum in order to insure complete softening of the water. It is exceedingly difficult to regulate this maximum by means of the usual hand controlled valve. In the present invention, however, this is accomplished by placing a set needle valve 37 to control the entrance of water from the feed pipe 16. At the time of installation, the needle valve is set so that the water flowing from the pipe 16 can not exceed the desired maximum for the tank used. It is also essential that the back wash water during the regenerative process be limited to a certain amount to obtain a maximum regenerative results for a minimum of salt. This is also controlled in the present invention by means of a second needle valve 38 positioned so that it controls the flow from the bottom pipe 19 to the discharge pipe 20. In this position it will limit the amount of back wash which will flow through the tank regardless of how wide the back wash valve 23 or the discharge valve may be opened.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A water treating apparatus comprising: a closed tank; a water dispersing medium in the bottom of said tank; a gravel bed on said dispersing medium; a layer of nonbuoyant, base exchange mineral supported on said gravel bed; a water discharge at the top of said tank; a side outlet positioned in said tank above the top of said gravel bed and below the top of said layer of mineral; and means for controlling the flow through said side outlet.

2. In a water softening device having a closed tank and a supporting bed in said tank for supporting base exchange material, means for discharging said base exchange material comprising: a pipe leading from an opening in the wall of said tank, said opening being positioned above the top level of said bed and below the top level of said base exchange material; means for bringing said base exchange material into suspension in said tank; and a valve positioned in said pipe relatively close to said tank so that said pipe may be opened to discharge the suspended base exchange material.

ROBERT O. FRIEND.
JOHN A. MONTGOMERY.